US008400956B2

(12) United States Patent
Jung et al.

(10) Patent No.: US 8,400,956 B2
(45) Date of Patent: Mar. 19, 2013

(54) METHOD AND APPARATUS FOR PROVIDING SERVICE GUIDE IN A MOBILE BROADCASTING SYSTEM

(75) Inventors: Bo-Sun Jung, Seongnam-si (KR); Kook-Heui Lee, Yongin-si (KR); Sung-Oh Hwang, Yongin-si (KR); Hyun-Chul Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 492 days.

(21) Appl. No.: 12/246,344

(22) Filed: Oct. 6, 2008

(65) Prior Publication Data

US 2009/0094644 A1 Apr. 9, 2009

(30) Foreign Application Priority Data

Oct. 5, 2007 (KR) .......................... 10-2007-100604

(51) Int. Cl.
*H04H 20/71* (2008.01)
*H04J 3/24* (2006.01)
*H04W 72/00* (2009.01)

(52) U.S. Cl. ........ 370/312; 370/233; 370/328; 370/331; 370/473; 455/433; 455/411; 455/454; 725/114

(58) Field of Classification Search .......... 370/228–463; 455/414.1–452.1
See application file for complete search history.

(56) References Cited

U.S. PATENT DOCUMENTS 7,614,068 B2 * 11/2009 Jansky ............................. 725/54
7,702,337 B2 * 4/2010 Vare et al. ................... 455/452.1
7,778,638 B2 * 8/2010 Shon .............................. 455/433
7,801,513 B2 * 9/2010 Jung et al. ................... 455/414.2
7,827,580 B2 * 11/2010 Rosberg et al. .................. 725/62
7,870,377 B2 * 1/2011 Jansky ............................ 713/2
8,055,258 B2 * 11/2011 Hwang et al. .............. 455/432.1
8,055,284 B2 * 11/2011 Jeon et al. ...................... 455/466
8,218,559 B2 * 7/2012 Vare et al. ...................... 370/412
2005/0090235 A1 * 4/2005 Vermola et al. ............. 455/414.3
2006/0212902 A1 * 9/2006 Seo et al. ......................... 725/39
2006/0242091 A1 * 10/2006 Jansky ............................ 706/15
2007/0036102 A1 * 2/2007 Hwang et al. ................. 370/328
2007/0041377 A1 * 2/2007 Song et al. ..................... 370/389
2007/0042757 A1 * 2/2007 Jung et al. ................... 455/412.2

(Continued)

FOREIGN PATENT DOCUMENTS

JP 10-145311 A 5/1998
JP 2004-32809 A 1/2004

(Continued)

OTHER PUBLICATIONS

Jani Vare, Target IPv6 ESG Root Descriptor—Use Case, XP 017805438, tm-cbms1259, Apr. 4, 2005.

(Continued)

*Primary Examiner* — Ayaz Sheikh
*Assistant Examiner* — Venkatesh Haliyur
(74) *Attorney, Agent, or Firm* — Jefferson IP Law, LLP

(57) ABSTRACT

A method and apparatus for providing an SG in a mobile broadcasting system are provided. The apparatus and method include a terminal for receiving a first SG, for acquiring reception information about a second SG from the first SG, if a service fragment list extracted from the first SG includes information about at least one second SG different from the first SG, and for receiving the second SG based on the acquired reception information.

16 Claims, 7 Drawing Sheets

U.S. PATENT DOCUMENTS

| | | | | |
|---|---|---|---|---|
| 2007/0045416 A1* | 3/2007 | Paila et al. | | 235/435 |
| 2007/0053291 A1* | 3/2007 | Hiltunen et al. | | 370/233 |
| 2007/0054634 A1* | 3/2007 | Seppala | | 455/121 |
| 2007/0055786 A1* | 3/2007 | Pohjolainen et al. | | 709/230 |
| 2007/0072543 A1* | 3/2007 | Paila et al. | | 455/3.06 |
| 2007/0086465 A1* | 4/2007 | Paila et al. | | 370/394 |
| 2007/0093202 A1* | 4/2007 | Hwang et al. | | 455/3.06 |
| 2007/0100984 A1* | 5/2007 | Jansky et al. | | 709/223 |
| 2007/0101352 A1* | 5/2007 | Rabina et al. | | 725/1 |
| 2007/0110056 A1* | 5/2007 | Hwang et al. | | 370/389 |
| 2007/0110057 A1* | 5/2007 | Hwang et al. | | 370/389 |
| 2007/0123244 A1* | 5/2007 | Paila | | 455/419 |
| 2007/0124359 A1* | 5/2007 | Hwang et al. | | 709/200 |
| 2007/0180133 A1* | 8/2007 | Vedantham et al. | | 709/230 |
| 2007/0204305 A1* | 8/2007 | Jung et al. | | 725/51 |
| 2007/0220558 A1* | 9/2007 | Jung et al. | | 725/62 |
| 2007/0240189 A1* | 10/2007 | Paila | | 725/62 |
| 2007/0268874 A1* | 11/2007 | Vare et al. | | 370/338 |
| 2007/0298756 A1* | 12/2007 | Hiltunen | | 455/403 |
| 2007/0300275 A1* | 12/2007 | Kim et al. | | 725/112 |
| 2008/0039078 A1* | 2/2008 | Xu et al. | | 455/432.1 |
| 2008/0045155 A1* | 2/2008 | Lee et al. | | 455/66.1 |
| 2008/0046926 A1* | 2/2008 | Jeon et al. | | 725/38 |
| 2008/0046941 A1* | 2/2008 | Sung et al. | | 725/105 |
| 2008/0070557 A1* | 3/2008 | Paila et al. | | 455/414.1 |
| 2008/0092163 A1* | 4/2008 | Song et al. | | 725/39 |
| 2008/0103789 A1* | 5/2008 | Paila et al. | | 705/1 |
| 2008/0127290 A1* | 5/2008 | Delegue et al. | | 725/114 |
| 2008/0148318 A1* | 6/2008 | Jung et al. | | 725/54 |
| 2008/0189540 A1* | 8/2008 | Jansky | | 713/2 |
| 2008/0285579 A1* | 11/2008 | Vare et al. | | 370/412 |
| 2009/0015660 A1* | 1/2009 | Vedantham et al. | | 348/14.09 |
| 2009/0025037 A1* | 1/2009 | Shon | | 725/50 |
| 2009/0094644 A1* | 4/2009 | Jung et al. | | 725/39 |
| 2009/0291631 A1* | 11/2009 | Xue et al. | | 455/3.01 |
| 2009/0316831 A1* | 12/2009 | Song et al. | | 375/301 |
| 2010/0180310 A1* | 7/2010 | Lee et al. | | 725/54 |

FOREIGN PATENT DOCUMENTS

| | | |
|---|---|---|
| JP | 2009-510813 A | 3/2009 |
| JP | 2009-512263 A | 3/2009 |
| WO | 2004/056096 A1 | 7/2004 |
| WO | 2007/023354 A2 | 3/2007 |
| WO | 2007/042886 A2 | 4/2007 |
| WO | 2007/042907 A2 | 4/2007 |
| WO | 2007/043798 A1 | 4/2007 |
| WO | 2007/052111 A2 | 5/2007 |
| WO | 2007/061267 A1 | 5/2007 |

OTHER PUBLICATIONS

ESG Implementation Guidelines, Draft ETSI TR 1XX XXX, V0.0.19, Technical Report, XP 017805589, Jun. 21, 2006.

David A. Smith, Validating The Delivery of DVB-H Content, XP 030081560, Rohde & Schwarz Europe GmbH, Germany, Sep. 6, 2007.

Open Mobile Alliance Ltd., Technical Paper: Service Guide for Mobile Broadcast Services, Draft Version 1.0, Mar. 27, 2007, OMA-TS-BCAST_ServiceGuide-V1_0_0-20070327-D, USA.

* cited by examiner

METHOD AND APPARATUS FOR PROVIDING SERVICE GUIDE IN A MOBILE BROADCASTING SYSTEM

PRIORITY

This application claims the benefit under 35 U.S.C. §119 (a) of a Korean patent application filed in the Korean Intellectual Property Office on Oct. 5, 2007 and assigned Serial No. 2007-100604, the entire disclosure of which is hereby incorporated by reference.

BACKGROUND OF THE INVENTION

1. Field of the Invention

The present invention relates to a mobile broadcasting system supporting a Broadcast Service (BCAST). More particularly, the present invention relates to a method and apparatus for providing another Service Guide (SG) through a basic SG in a mobile broadcasting system.

2. Description of the Related Art

The mobile communication market faces ever-increasing demands for new services through the recombination or convergence of existing technologies. The development of communications and broadcasting technologies has reached the point that a broadcasting service can be provided through a portable terminal (hereinafter, a mobile terminal) such as a portable phone, a Personal Digital Assistant (PDA), etc. With all of these potential and actual market demands, including the rapidly increasing user demands for multimedia service, the strategies of service providers that intend to provide new services including a broadcasting service beyond the conventional voice service, and the interests of Internet Technology (IT) companies that reinforce mobile communication businesses by meeting customer demands, the convergence between mobile communications and Internet Protocol (IP) has been a significant trend in the technological development of future-generation mobile communication systems. The resulting grand convergence, that is, the introduction of various wireless or broadcasting services to the wired communication market as well as the mobile communication market has formed the same consumer environment for various services irrespective of wired or wireless broadcasting.

The Open Mobile Alliance (OMA) is an organization that works on standardization of inter-operability between individual mobile solutions. The OMA mainly serves to establish a variety of application standards for mobile communication gaming, Internet service, etc. The OMA BCAST working group is studying a technological standard for providing a broadcasting service through a mobile terminal. That is, the OMA BCAST working group is underway to standardize techniques for providing IP-based broadcasting services in a mobile terminal environment, including providing of a Service Guide (SG), download and streaming transmission, service and content protection, service subscription roaming, etc.

Along with the market trend toward provisioning of integrated services based on wired-wireless convergence, mobile broadcasting technologies including OMA BCAST will also advance to provide services in a wired-wireless integrated environment beyond the mobile environment.

FIG. 1 is a block diagram of a conventional structure for transmitting an SG to a mobile terminal in a mobile broadcasting system.

Referring to FIG. 1, interfaces between components (logical entities) illustrated in FIG. 1 will first be described in Table 1 and Table 2.

TABLE 1

| Interface | Description |
|---|---|
| SG1 | Server-to-server communications for delivering content attributes such as description information, location information, target terminal capabilities, target user profile, etc. either in the form of BCAST SG fragments or in a proprietary format. |
| SG2 | Server-to-server communications for delivering BCAST service attributes such as service/content description information, scheduling information, location information, target terminal capabilities, target user profile, etc. in the form of BCAST SG fragments. |
| SG-B1 | Server-to-server communications for either delivering Broadcast Distribution System (BDS) specific from BDS to BCAST SG Adaptation function, to assist SG adaptation to specific BDS, or to deliver BCAST SG attributes to BDS for BDS specific adaptation and distribution. |
| SG4 | Server-to-server communications for delivering provisioning information, purchase information, subscription information, promotional information, etc., in the form of BCAST SG fragments. |
| SG5 | Delivery of BCAST SG through Broadcast Channel, over IP. |
| SG6 | Delivery of BCAST SG through Interaction Channel, interactive access to retrieve SG or additional information related to SG, for example, by HTTP, SMS or MMS. |

TABLE 2

| Interface | Description |
|---|---|
| x-1 124 | Reference Point between BDS Service Distribution and BDS 122 |
| x-2 125 | Reference Point between BDS Service Distribution and Interaction Network 123 |
| x-3 126 | Reference Point between BDS 122 and Terminal 119 |
| x-4 127 | Reference Point between BDS Service Distribution 121 and Terminal 119 over Broadcast Channel |
| x-5 128 | Reference Point between BDS Service Distribution and Terminal over Interaction Channel (Air Interface 130) |
| x-6 129 | Reference Point between Interaction Network 123 and Terminal 119 |

Referring to FIG. 1, a content creator 101 creates a broadcast service (hereinafter, a BCAST service). The BCAST service can be a conventional audio/video broadcasting service or a conventional music/data file download service. In the content creator 101, an SG Content Creation Source (SGCCS) 102 transmits content description information, terminal capabilities information, user profiles, and content timing information required for configuring an SG for the BCAST service to an SG Application Source (SGAS) 105 of a BCAST service application 104 via an SG1 interface 103 described in Table 1.

The BCAST service application 104 generates BCAST service data by receiving data for the BCAST service from the content creator 101 and processing the data in a form suitable for a BCAST network. The BCAST service application 104 also generates standardized meta data needed for mobile broadcasting guidance. The SGAS 105 transmits information received from the SGCCS 102 and sources required for configuring the SG, including service/content description information, scheduling information and location information, to an SG Generator (SG-G) 109 of a BCAST service distributor/adapter 108 via an SG2 interface 106 also described in Table 1.

The BCAST service distributor/adapter 108 establishes a bearer for delivering the BCAST service data received from the BCAST service application 104, schedules transmission of the BCAST service, and generates mobile broadcasting guide information. The BCAST service distributor/adapter 108 is connected to a Broadcast Distribution System (BDS) 122, that transmits the BCAST service data, and to an interaction network 123 that supports bi-directional communications.

The SG generated in the SG-G 109 is provided to a mobile terminal 119 through an SG Distributor (SG-D) 110 and an SG-5 interface 117. If the SG needs to be provided through the BDS 122 or the interaction network 123, or the SG needs to be adapted to suit a specific system or network, it is provided to the SG-D 110 after adaptation in an SG Adapter (SG-A) 111, or to a later-described BDS service distributor 121 via an SG-B1 interface 116.

A BCAST subscription manager 113 manages subscription information required for BCAST service reception, service provision information, and device information about mobile terminals to receive the BCAST service. An SG Subscription Source (SGSS) 114 of the BCAST subscription manager 113 transmits provisioning information, purchase information, subscription information, and promotional information in relation to SG generation to the SG-G 109 via an SG4 interface 112.

The BDS service distributor 121 distributes all received BCAST services on broadcast channels or on interaction channels. The BDS service distributor 121 is an optional entity that can be used or not depending on the type of the BDS 122. The BDS 122 is a network over which the BCAST service is delivered. For example, the BDS 122 can be a broadcasting network such as Digital Video Broadcasting-Handheld (DVB-H), Multimedia Broadcast/Multicast Service (MBMS), or $3^{rd}$ Generation Partnership Project 2 (3GPP2) Broadcast Multicast Service (BCMCS). The interaction network 123 transmits the BCAST service in a one-to-one manner or exchanges control information and additional information associated with BCAST service reception bi-directionally. For example, the interaction network 123 can be a legacy cellular network.

In FIG. 1, the mobile terminal 119 is a BCAST reception-enabled terminal. Depending on its performance, the mobile terminal 119 can be connected to a cellular network. The mobile terminal 119, which includes an SG Client (SG-C) 120, receives the SG via an SG5 interface 117 or a notification message via an SG6 interface 118 and appropriately operates to receive the BCAST service.

Table 3, Table 4 and Table 5 summarize the functions of major components (logical entities) illustrated in FIG. 1, defined in the OMA BCAST standards.

TABLE 3

| Logical entity | Description |
| --- | --- |
| Content creator 101 | In the content creator, SGCCS may provide content attributes such as content description information, target terminal capabilities, target user profile, content timing information, etc. and may send them over SG1 in the form of standardized BCAST SG fragments or in a proprietary format. |
| BCAST service application 104 | In the BCAST service application, SGAS 105 provides service/content description information, scheduling information, location information, target terminal capabilities, target user profile, etc., and sends them over SG2 106 in the form of standardized BCAST SG fragments. |
| BCAST subscription manager 113 | In BCAST subscription manager, SGSS 114 provides provisioning information, purchase information, subscription information, promotional information, etc., and sends them over SG4 112 in the form of SG fragments. |

TABLE 4

| Logical entity | Description |
| --- | --- |
| SG-G 109 | The SG-G in the network is responsible for receiving SG fragments from various sources such as SGCCS 102, SGAS 105, SGSS 114 over SG-2 and SG-4 interfaces. SG-G 109 assembles the fragments such as services and content access information according to a standardized schema and generates SG which is sent to SG-D for transmission. Before transmission, it is optionally adapted in the SG-A 111 to suit a specific BDS. |
| SG-C 120 | The SG-C in the terminal 119 is responsible for receiving the SG information from the underlying BDS and making the SG available to the mobile terminal. The SG-C obtains specific SG information. It may filter it to match the terminal specified criteria (for example, location, user profile, terminal capabilities), or it |

TABLE 4-continued

| Logical entity | Description |
| --- | --- |
| | may simply obtain all available SG information. Commonly, the user may view the SG information in a menu, list or tabular format. SG-C may send a request to the network through SG-6 118 to obtain specific SG information, or the entire SG. |

TABLE 5

| Logical entity | Description |
| --- | --- |
| SG-D 110 | SG-D generates an IP flow to transmit SG over the SG5 interface 118 and the broadcast channel to the SG-C 120. Before transmission, the SG-G may send SG to SG-A 111 to adapt the SG to suit specific BDS according to the BDS attributes sent by BDS service distributor over SG-B1 116. The adaptation might result in modification of SG. Note that, for adaptation purpose, the SG-A may also send the BCAST SG attributes or BCAST SG fragments over SG-B1 to BDS service distributor for adaptation, this adaptation within BDS service distributor is out of the scope of BCAST, SG-D may also receive a request for SG information, and send the requested SG information to the terminal directly through the interaction channel. SG-D also may filter SG information from SG-G 109 based on End Users pre-specified profile. SG-D may also send the SG to the BDS, which modifies the SG (e.g., by adding BSD specific information), and further distributes the SG to the SG-C in a BDS specific manner. |

FIG. 2 illustrates a conventional OMA BCAST SG data model for generating an SG. In FIG. 2, a solid line connecting fragments indicates cross-reference between the fragments.

Referring to FIG. 2, the SG data model includes an Administrative Group 200 for providing upper configuration information about the entire SG, a Provisioning Group 210 for providing subscription information and purchase information, a Core Group 220 for providing core information about the SG, such as services/contents and schedules, and an Access Group 230 for providing access information by which to access the services/contents.

The Administrative Group 200 includes an SG Delivery Descriptor (SGDD) 201 and the Provisioning Group 210 includes a Purchase Item 211, a Purchase Data 212, and a Purchase Channel 213.

The Core Group 220 includes a Service 221, a Schedule 222, and a Content 223. The Access Group 230 is configured to include an Access 231 and a Session Description 232.

In addition to the four groups 200, 210, 220 and 230, the SG information may further include a Preview Data 241 and an Interactivity Data 251. The above-described components of the SG are called fragments, with minimum units constituting the SG.

As to the fragments, the SGDD fragment 201 provides information on a delivery session carrying an SG Delivery Unit (SGDU) with fragments, provides grouping information about the SGDU, and an entry point for receiving a notification message.

The Service fragment 221 is an upper aggregate of content included in a broadcast service, as a core of the entire SG, and provides service content, genres, service location information, etc.

The Schedule fragment 222 provides time information of the content included in the service, such as streaming, downloading, etc.

The Content fragment 223 provides a description, a target user group, a service area, and genres for the broadcast content.

The Access fragment 231 provides access information to allow the user to access the service, and also provides information about the delivery scheme of an access session and session information about the access session.

The Session Description fragment 232 can be included in the Access fragment 231. Alternatively, information about the location of the Session Description fragment 232 is given in the form of a Uniform Resource Identifier (URI), so that the terminal can detect the Session Description fragment 232. In addition, the Session Description fragment 232 provides address information and codec information about multimedia content included in a session.

The Purchase Item fragment 211 groups one or more multiple services or scheduled items together, so that the user can purchase a service or a service bundle or subscribe to it.

The Purchase Data fragment 212 includes purchase and subscription information about services or service bundles, such as price information and promotion information.

The Purchase Channel fragment 213 provides access information for subscription to or purchase of a service or a service bundle.

The SGDD fragment 201 indicates an entry point for receiving the serice guide and provides grouping information about an SGDU being a container of fragments.

The Preview Data fragment 241 provides preview information about services, schedules and contents, and the Interactivity Data fragment 251 provides an interactive service during broadcasting according to services, schedules, and contents. Detailed information on the SG can be defined by various elements and attributes for providing contents and values based on the upper data model of FIG. 2.

For convenience, although the elements and attributes for each of the fragments of the SG are not included herein, the elements and attributes do not limit the present invention, and the present invention is applicable to all necessary elements and attributes defined to provide an SG for a mobile broadcasting service.

In the course of generating a service guide in the SG-G 109 based on the SG data model and providing the fragments of the SG through the SG-D 110 and the SG-C 120 being a user terminal, the more services and contents that service providers provide, the more information is transmitted. The resulting exponential increase of the fragments of the SG in size and number may cause a significant increase in the overhead of receiving the fragments, in the time for assembling the SG and in the time and resources for displaying it in the terminal.

SUMMARY OF THE INVENTION

An aspect of the present invention is to address at least the above-mentioned problems and/or disadvantages and to provide at least the advantages described below. Accordingly, an aspect of the present invention is to provide a method and apparatus for distributing a basic SG, first of all, to provide a service efficiently and enabling reception of complementary information about the basic SG or another stand-alone SG using the basic SG in a mobile broadcasting system.

In accordance with an aspect of the present invention, a method for receiving an SG in a terminal in a mobile broadcasting system is provided. The method includes receiving a first SG, if a service fragment list extracted from the first SG includes information about at least one second SG different from the first SG, reception information about the second SG is acquired from the first SG, and the second SG is received based on the acquired reception information.

In accordance with another aspect of the present invention, a method for providing an SG in a mobile broadcasting system is provided. The method includes forming a first SG and at least one second SG, adding reception information about the second SG to the first SG, transmitting the first SG having the reception information about the second SG to a terminal and, when the terminal accesses the reception information about the second SG, the second SG is provided to the terminal.

In accordance with a further aspect of the present invention, an apparatus for receiving an SG in a terminal in a mobile broadcasting system is provided. The apparatus includes a broadcast data receiver for receiving broadcasting data, an SG receiver for acquiring a first SG and at least one second SG from the broadcast data, an SG interpreter for acquiring reception information about the second SG by interpreting the first SG, and an SG display for displaying at least one of the acquired first SG and the second SG.

In accordance with still another aspect of the present invention, an apparatus for providing an SG in a mobile broadcasting system is provided. The apparatus includes an SG generator for forming a first SG and at least one second SG and for adding reception information about the second SG to the first SG, and an SG transmitter for transmitting the first SG having the reception information about the second SG to a terminal and for providing the second SG to the terminal, when the terminal accesses the reception information about the second SG.

Other aspects, advantages, and salient features of the invention will become apparent to those skilled in the art from the following description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While a description of exemplary embodiments of the present invention will be made herein using the names of the entities defined in the 3GPP, which is the asynchronous mobile communication standard, or defined in the OMA BCAST, a standard group for the application of mobile terminals, the stated standards and entity names thereof are not intended to limit the scope of the present invention, and the present invention can be applied to any system having a similar technical background.

For a better understanding of exemplary embodiments of the present invention, a message scheme table used in the present invention will be described with reference to Table 6.

TABLE 6

| Name | Type | Category | Cardinality | Description | Data Type |
| --- | --- | --- | --- | --- | --- |
|  |  |  |  |  |  |

In Table 6, the term "Name" indicates the name of an entity being an element or an attribute in a message. The term "Type" indicates whether the entity is an element or an attribute. If the entity is an element, it has a value of E1, E2, E3 or E4, wherein E1 indicates an upper element in the entire message, E2 indicates a sub-element of E1, E3 indicates a sub-element of E2, and E4 indicates a sub-element of E3. If the entity is an attribute, its Type is A. For example, A under E1 indicates an attribute of E1. The term "Category" indicates whether the element or attribute is mandatory or optional. If the element or attribute is mandatory, Category is M and if it is optional, Category is O. The term "Cardinality" indicates the relationship between elements, and has a value of 0, 0 . . . 1, 1, 0 . . . n, or 1 . . . n. Herein, 0 means an optional relationship, 1 means a mandatory relationship, and n means that a plurality of values can be used. For example, 0 . . . n means that the element may have no value, or n values. The term "Description" describes the element or attribute in plain text and the term "Data Type" defines the data structure of the element or attribute.

Figure 3:
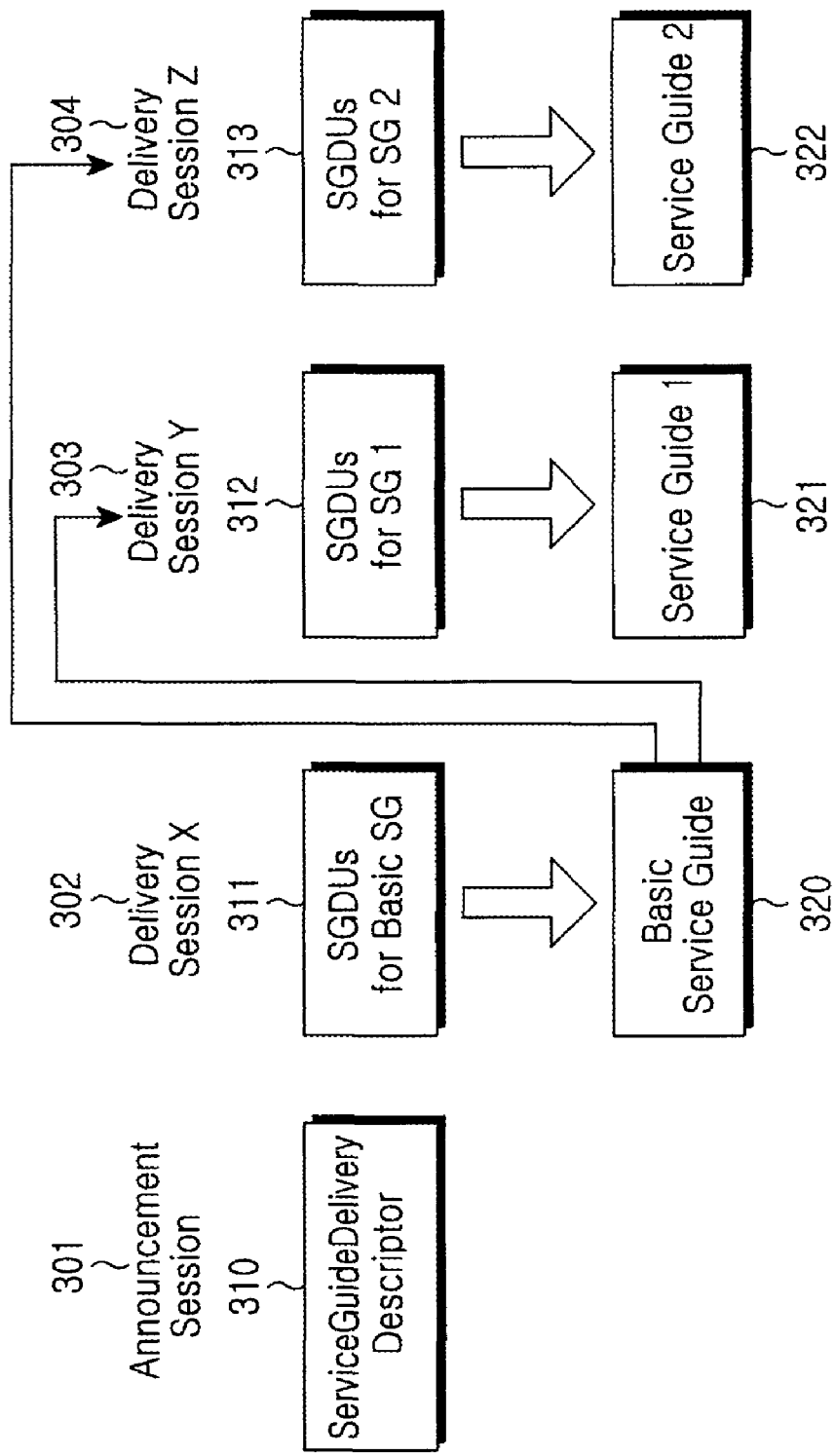
FIG. 3 illustrates a method for receiving an SG using a basic SG according to an exemplary embodiment of the present invention.

FIG. 3 illustrates a method for receiving an SG and a method for providing another SG using a basic SG according to an exemplary embodiment of the present invention.

Referring to FIG. 3, the SG-C of a terminal (not shown) in a mobile broadcasting system accesses an Announcement Session 301 and receives an SGDD 310 in the Announcement Session 301. As stated before, the SGDD 310 includes an SGDU list and information about delivery sessions carrying SGDUs. In the exemplary implementation of FIG. 3, the SGDD 310 has an SGDU list containing fragments of a basic SG and information about a delivery session 302 (Delivery Session X) carrying intended SGDUs. The terminal interprets the SGDD 310, accesses Delivery Session X, and receives SGDUs 311 for the basic SG from Delivery Session X. The terminal then extracts fragments for the basic SG from the SGDUs 311 and displays a final basic SG 320 to the user.

The basic SG 320 may include complementary information about a service or provide information about how to access an SG provided by another service provider. In FIG. 3, the terminal can detect reception information about a first SG 321 (SG 1) and a second SG 322 (SG 2) in the basic SG 320. The reception information about SG1 includes information about a delivery session 303 (Delivery Session Y) carrying SGDUs 312 for SG 1 and the reception information about SG2 includes information about a delivery session 304 (Delivery Session Z) carrying SGDUs 313 for SG 2. The terminal accesses Delivery Session Y or Delivery Session Z, receives the SGDUs 312 for SG 1 or the SGDUs 313 for SG 2, and displays SG1 or SG2 to the user.

Figure 4:
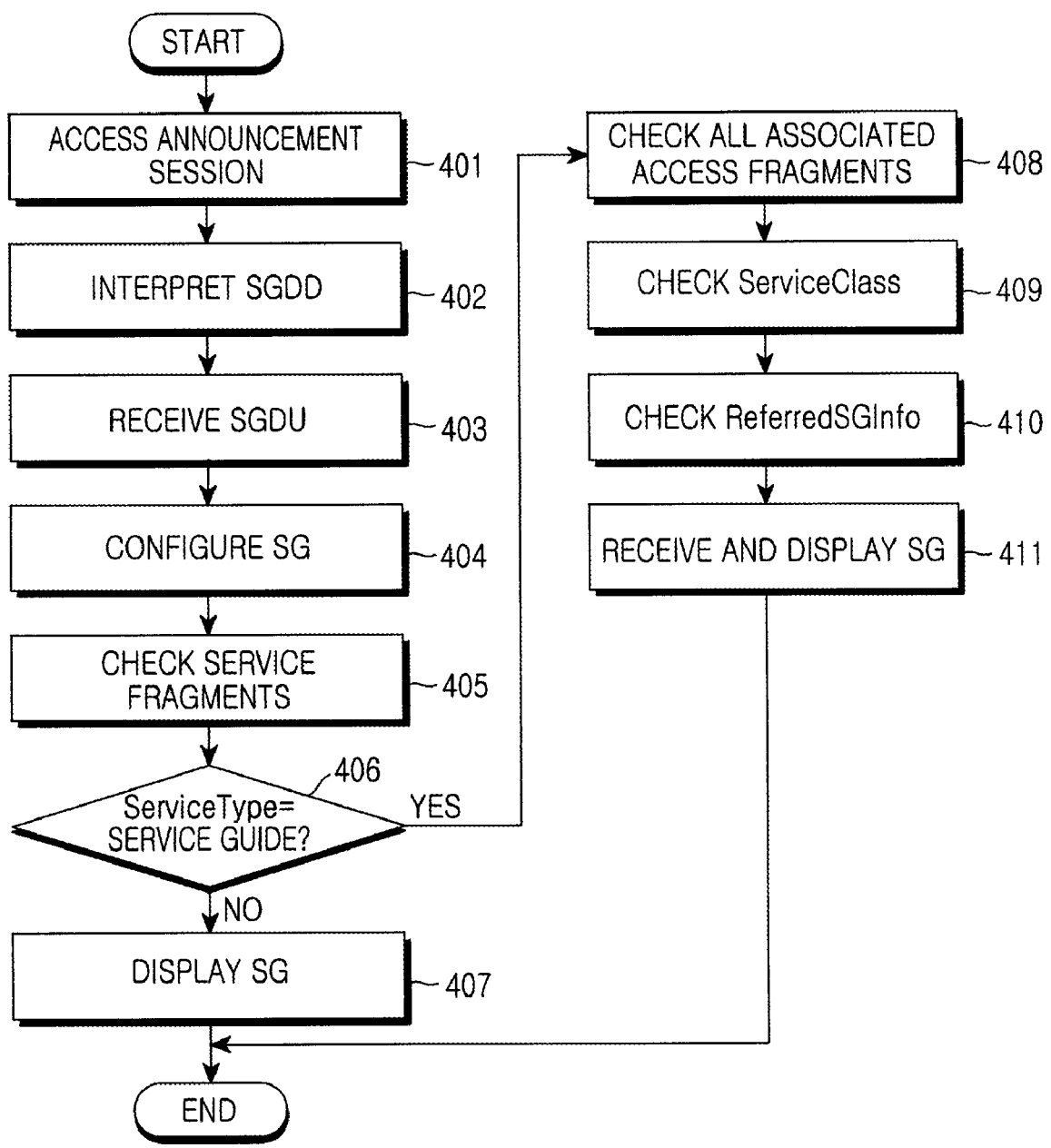
FIG. 4 is a flowchart illustrating an operation for receiving an SG using a basic SG in a terminal according to an exemplary embodiment of the present invention.

FIG. 4 is a flowchart illustrating an SG reception method in a terminal according to an exemplary embodiment of the present invention.

Figure 5:
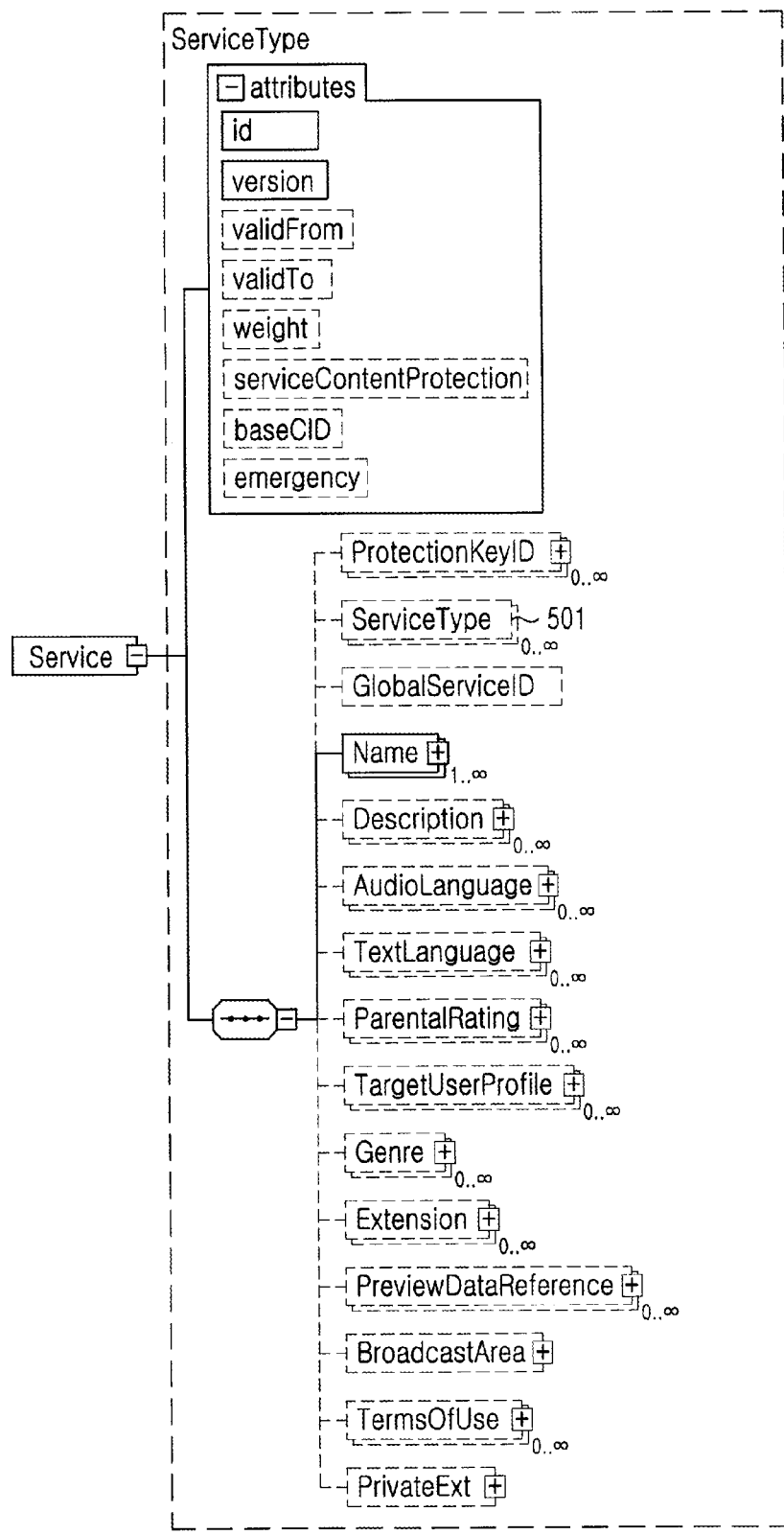
FIG. 5 is an exemplary view of information in a Service fragment in an OMA BCAST SG data model.

Referring to FIG. 4, the terminal accesses an Announcement Session and receives an SGDD in the Announcement Session in step 401. In step 402, the terminal interprets the SGDD and detects information about a delivery session and SGDUs that carry fragments for an SG. The terminal receives all of the SGDUs indicated by the SGDD from the delivery session in step 403. The terminal extracts fragments from the SGDUs and configures an SG by interpreting the fragments in step 404 and checks a list of Service fragments in the SG in step 405. FIG. 5 is a diagram illustrating exemplary upper element values and attribute values of a Service fragment.

In step 406, the terminal determines whether a ServiceType 501 (FIG. 5) set to Service Guide exists by interpreting the Service fragments of the Service fragment list. In the absence of the ServiceType 501 set to Service Guide, it can be considered that the SG contains only information that the terminal has received from a service provider, without information about provisioning of another SG. In this case, the terminal displays the SG to the user in step 407.

Figure 6:
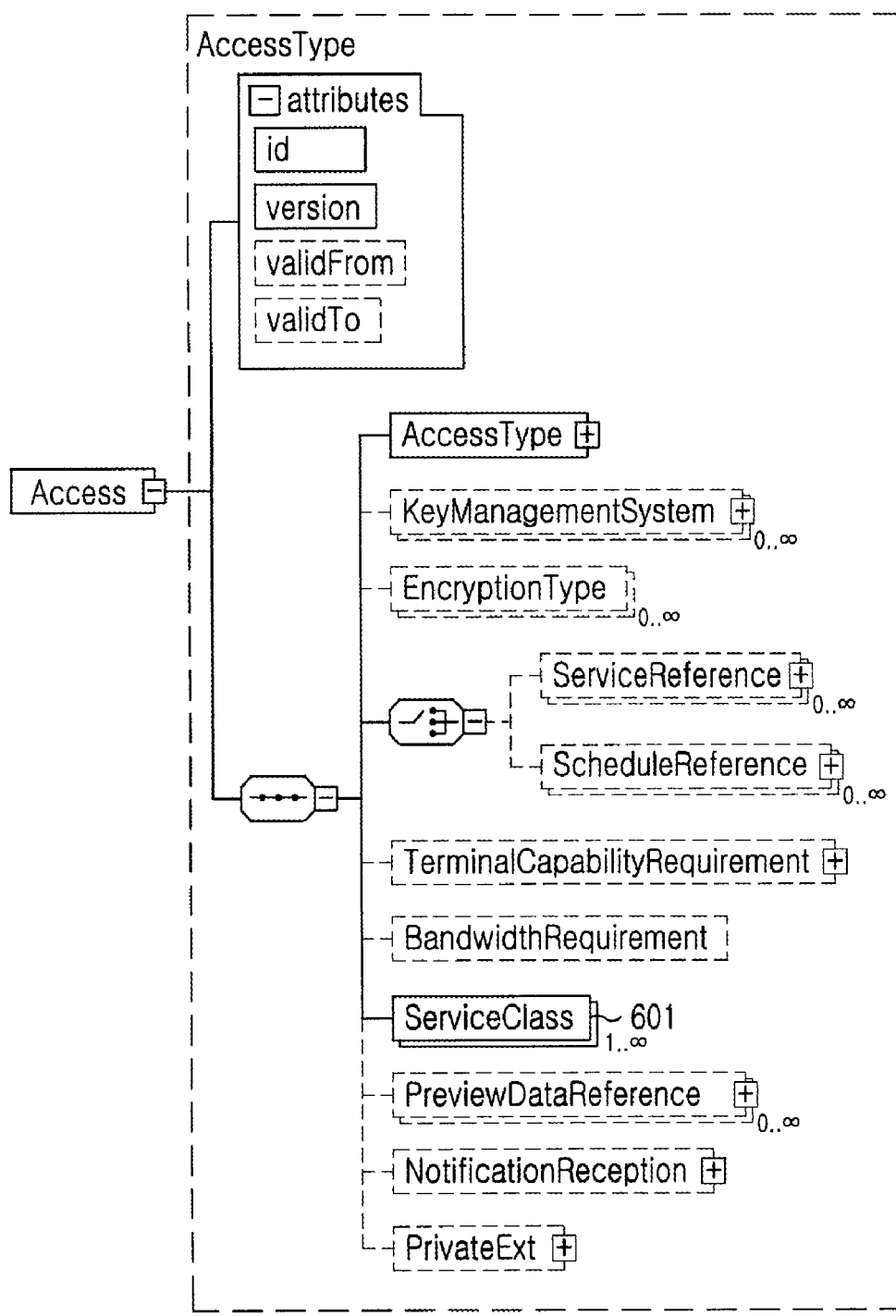
FIG. 6 is an exemplary view of information in an Access fragment in an OMA BCAST SG data model.

In the alternative, if the ServiceType 501 set to Service Guide does exist, which implies the inclusion of information about reception of and access to another SG in the SG, the terminal detects all Access fragments associated with the Service fragment with the ServiceType 501 set to Service Guide in step 408. FIG. 6 is a diagram illustrating exemplary upper element values and attribute values of an Access fragment.

In step 409, the terminal determines the value of a ServiceClass 601 in each of the detected Access fragments. If the ServiceClass 601 is 'urn:oma:oma_bsc:sg:1.0', this means that a delivery session corresponding to access information included in the Access fragment carries a stand-alone SG. If the ServiceClass 601 is 'urn:oma:oma_bsc:csg:1.0', this means that the delivery session corresponding to the access information included in the Access fragment carries a complementary SG that provides complementary information about the SG. Thus, the terminal acquires preliminary information about the stand-alone SG or the complementary SG by checking a sub-element of the ServiceClass, ReferredSGInfo in step 410, which is given as follows.

TABLE 7

| Name | Type | Category | Cardinality | Description | Data Type |
|---|---|---|---|---|---|
| Access | E | | | 'Access' fragment Contains the following attributes: id version validFrom validTo Contains the following elements: AccessType KeyManagementSystem EncryptionType ServiceReference ScheduleReference TerminalCapabilityRequirement BandwidthRequirement ServiceClass PreviewDataReference NotificationReception PrivateExt | |
| id | A | NM/TM | 1 | ID of the 'Access' fragment. The value of this attribute SHALL be globally unique. | anyURI |

TABLE 7-continued

| Name | Type | Category | Cardinality | Description | Data Type |
|---|---|---|---|---|---|
| version | A | NM/TM | 1 | Version of this fragment. The newer version overrides the older one starting from the time specified by the validFrom attribute, or as soon as it has been received if no validFrom attribute is given. | unsignedInt |
| validFrom | A | NM/TM | 0...1 | The first moment when this fragment is valid. If not given, the validity is assumed to have started at some time in the past. This field contains the 32bits integer part of an NTP time stamp. | unsignedInt |
| validTo | A | NM/TM | 0...1 | The last moment when this fragment is valid. If not given, the validity is assumed to end in undefined time in the future. This field contains the 32bits integer part of an NTP time stamp. | unsignedInt |
| AccessType | E1 | NM/TM | 1 | Defines the type of access. Note: Either one of 'BroadcastServiceDelivery' or 'UnicastServiceDelivery' but not both SHALL be instantiated. Implementation in XML Schema should use <choice>. Contains the following elements: BroadcastServiceDelivery UnicastServiceDelivery | |
| BroadcastServiceDelivery | E2 | NM/TM | 0...1 | This element is used for the indication of IP transmission. Contains the following elements: BDSType SessionDescription FileDescription | |
| BDSType | E3 | NM/TM | 0...1 | Identifier of the type of underlying distribution system that this 'Access' fragment relates to. Contains the following element: Type Version | |
| Type | E4 | NM/TM | 0...1 | Type of underlying BDS, possible values: 0. IPDC over DVB-H 1. 3GPP MBMS 2. 3GPP2 BCMCS 3-127. reserved for future use 128-255. reserved for proprietary use | unsignedByte |
| Version | E4 | NM/TM | 0...N | Version of underlying BDS. For instance, possible values are Rel-6 or Rel-7 for MBMS and 1x or HRPD or Enhanced HRPD for BCMCS. | string |
| SessionDescription | E3 | NM/TM | 0...1 | Reference to or inline copy of a Session Description information associated with this 'Access' fragment that the media application in the terminal uses to access the service. Note: a referenced 'SessionDescription' fragment may be delivered in two ways: via broadcast or via fetch over interaction channel. In the case of fetch over interaction channel, the 'SessionDescription' fragment can be acquired by accessing | |

TABLE 7-continued

| Name | Type | Category | Cardinality | Description | Data Type |
|---|---|---|---|---|---|
| | | | | the URI (given as attribute of the different Session Description reference elements). Contains the following elements: SDP SDPRef USBDRef ADPRef The presence of elements 'SDP' and 'SDPRef' are mutually exclusive. If 'SessionDescription' element is provided, and the 'type' attribute has one of the values "4" or "5", the terminal MAY use it instead of fetching Session Description information via RTSP. | |
| SDP | E4 | NM/TM | 0...1 | An inlined Session Description in SDP format [RFC 4566] that SHALL either be embedded in a CDATA section or base64-encoded. Contains the following attribute: encoding | string |
| encoding | A | NM/TM | 0...1 | This attribute signals the way the Session Description has been embedded: It SHALL NOT be present when the Session Description is embedded into a CDATA section. It SHALL be present and set to "base64" in case the Session Description is base64-encoded. | string |
| SDPRef | E4 | NM/TM | 0...1 | Reference to a Session Description in SDP format [RFC 4566] Contains the following attributes: uri idRef If both 'uri' and 'idRef' are present, the referenced Session Description information SHALL be identical. | |
| uri | A | NM/TM | 0...1 | The URI referencing an external resource containing SDP information. This URI is used for interactive retrieval. | anyURI |
| idRef | A | NM/TM | 0...1 | The id of the referenced 'SessionDescription' fragment if the fragment is delivered over the broadcast channel in SGDU, globally unique | anyURI |
| USBDRef | E4 | NM/TM | 0...1 | Reference to an instance of MBMS User Service Bundle Description as specified in [26.346] section 5.2.2, with the restrictions defined in section 5.1.2.5 of this spec. Contains the following attributes: uri idRef If both 'uri' and 'idRef' are present, the referenced Session Description information SHALL be identical. | |
| uri | A | NM/TM | 0...1 | The URI referencing an external resource containing MBMS-USBD information. | anyURI |

TABLE 7-continued

| Name | Type | Category | Cardinality | Description | Data Type |
|---|---|---|---|---|---|
| | | | | This URI is used for interactive retrieval. | |
| idRef | A | NM/TM | 0...1 | The id of the referenced 'SessionDescription' fragment if the fragment is delivered over the broadcast channel in SGDU, globally unique | anyURI |
| ADPRef | E4 | NM/TM | 0...1 | Reference to an AssociatedDeliveryProcedure for File and Stream Distribution as specified in [BCAST10-Distribution] section 5.3.4. Contains the following attributes: uri idRef If both 'uri' and 'idRef' are present, the referenced Session Description information SHALL be identical. | |
| uri | A | NM/TM | 0...1 | The URI referencing an external resource containing AssociatedDeliveryProcedure for File and Stream Distribution. This URI is used for interactive retrieval. | anyURI |
| idRef | A | NM/TM | 0...1 | The id of the referenced 'SessionDescription' fragment if the fragment is delivered over the broadcast channel in SGDU, globally unique | anyURI |
| FileDescription | E3 | NO/TM | 0...1 | File metadata for file delivery sessions. This element SHALL be provided when ALC is used. This element SHALL NOT be used in conjunction with FLUTE. The network SHALL support 'FileDescription' element and all its sub-elements and attributes if ALC is used for File Distribution function. Contains the following attributes: Content-Type Content-Encoding FEC-OTI-FEC-Encoding-ID FEC-OTI-FEC-Instance-ID FEC-OTI-Maximum-Source-Block-Length FEC-OTI-Encoding-Symbol-Length FEC-OTI-Max-Number-of-Encoding-Symbols FEC-OTI-Scheme-Specific-Info Contains the following elements: File | |
| Content-Type | A | NO/TM | 0...1 | See RFC 3926, section 3.4.2 | string |
| Content-Encoding | A | NO/TM | 0...1 | See RFC 3926, section 3.4.2 | string |
| FEC-OTI-FEC-Encoding-ID | A | NO/TM | 0...1 | See RFC 3926, section 3.4.2 | unsignedByte |
| FEC-OTI-FEC-Instance-ID | A | NO/TM | 0...1 | See RFC 3926, section 3.4.2 | unsignedLong |
| FEC-OTI-Maximum-Source- | A | NO/TM | 0...1 | See RFC 3926, section 3.4.2 | unsignedLong |

TABLE 7-continued

| Name | Type | Category | Cardinality | Description | Data Type |
|---|---|---|---|---|---|
| Block-Length | | | | | |
| FEC-OTI-Encoding-Symbol-Length | A | NO/TM | 0 . . . 1 | See RFC 3926, section 3.4.2 | unsignedLong |
| FEC-OTI-Max-Number-of-Encoding-Symbols | A | NO/TM | 0 . . . 1 | See RFC 3926, section 3.4.2 | unsignedLong |
| FEC-OTI-Scheme-Specific-Info | A | NO/TM | 0 . . . 1 | This attribute MAY be used to communicate FEC information which is not adequately represented by the other attributes related to FEC. | base64 Binary |
| File | E4 | NO/TM | 1 . . . N | Parameters of a file. Contains the following attributes: Content-Location TOI Content-Length Transfer-Length Content-Type Content-Encoding Content-MD5 FEC-OTI-FEC-Encoding-ID FEC-OTI-FEC-Instance-ID FEC-OTI-Maximum-Source-Block-Length FEC-OTI-Encoding-Symbol-Length FEC-OTI-Max-Number-of-Encoding-Symbols FEC-OTI-Scheme-Specific-Info | |
| Content-Location | A | NO/TM | 1 | See RFC 3926, section 3.4.2 | anyURI |
| TOI | A | NO/TM | 1 | See RFC 3926, section 3.4.2 | positiveInteger |
| Content-Length | A | NO/TM | 0 . . . 1 | See RFC 3926, section 3.4.2 | unsignedLong |
| Transfer-Length | A | NO/TM | 0 . . . 1 | See RFC 3926, section 3.4.2 | unsignedLong |
| Content-Type | A | NO/TM | 0 . . . 1 | See RFC 3926, section 3.4.2 | string |
| Content-Encoding | A | NO/TM | 0 . . . 1 | See RFC 3926, section 3.4.2 | string |
| Content-MD5 | A | NO/TM | 0 . . . 1 | See RFC 3926, section 3.4.2 | base64 Binary |
| FEC-OTI-FEC-Encoding-ID | A | NO/TM | 0 . . . 1 | See RFC 3926, section 3.4.2 | unsignedByte |
| FEC-OTI-FEC-Instance-ID | A | NO/TM | 0 . . . 1 | See RFC 3926, section 3.4.2 | unsignedLong |
| FEC-OTI-Maximum-Source-Block-Length | A | NO/TM | 0 . . . 1 | See RFC 3926, section 3.4.2 | unsignedLong |
| FEC-OTI-Encoding-Symbol-Length | A | NO/TM | 0 . . . 1 | See RFC 3926, section 3.4.2 | unsignedLong |
| FEC-OTI-Max-Number-of-Encoding-Symbols | A | NO/TM | 0 . . . 1 | See RFC 3926, section 3.4.2 | unsignedLong |
| FEC-OTI-Scheme-Specific-Info | A | NO/TM | 0 . . . 1 | This attribute MAY be used to communicate FEC information which is not adequately represented by the other attributes related to FEC. | base64 Binary |

TABLE 7-continued

| Name | Type | Category | Cardinality | Description | Data Type |
|---|---|---|---|---|---|
| UnicastServiceDelivery | E2 | NM/TM | 0 . . . N | This element indicates which server and/or protocol is used for delivery of service over Interaction Channel. Contains the following attribute: type Contains the following elements: AccessServerURL SessionDescription ServiceAccessNotificationURL | |
| type | A | NM/TM | 1 | Specifies transport mechanism that is used for this access. 0 - HTTP 1 - WAP 1.0 2 - WAP 2.x 3 - Generic RTSP to initialize RTP delivery 4 - RTSP to initialize RTP delivery as per 3GPP-PSS (3GPP packet-switched streaming service) 5 - RTSP to initialize RTP delivery as per 3GPP2-MSS (3GPP2 multimedia streaming services) 6 - FLUTE over Unicast 7-127 Reserved for future use 128-255 Reserved for proprietary use Note: Specification or negotiation of ports used for unicast service delivery is handled by the used unicast distribution mechanisms. For example, RTSP and PSS based systems (values 3 and 4) do port negotiation within the RTSP signalling exchange. | unsignedByte |
| AccessServerURL | E3 | NM/TM | 0 . . . N | Server URL from which the terminal can receive the service via the Interaction Network as specified in section 5.5 and 6.5 of [BCAST10-Distribution]. For example, AccessServerURL can be an HTTP URL pointing to downloadable content, or an RTSP URL pointing to a streaming server for starting a streaming session. If 'type' attribute has one of the values "3", "4" or "5" either E3 element 'SessionDescription' or E3 element 'AccessServerURL' or both SHALL be instantiated. | anyURI |
| SessionDescription | E3 | NM/TM | 0 . . . 1 | Reference to or inline copy of a Session Description information associated with this 'Access' fragment that the media application in the terminal uses to access the service. Note: a referenced 'SessionDescription' fragment may be delivered in two ways: via broadcast or via fetch over interaction channel. In the case of fetch over interaction channel, the 'SessionDescription' fragment can be acquired by accessing the URI (given as attribute of the different Session | |

TABLE 7-continued

| Name | Type | Category | Cardinality | Description | Data Type |
|---|---|---|---|---|---|
| | | | | Description reference elements). Contains the following elements: SDP SDPRef USBDRef ADPRef The presence of elements 'SDP' and 'SDPRef' are mutually exclusive. If 'SessionDescription' E3 element is instantiated, and the 'type' attribute has one of the values "3", "4" or "5", the terminal MAY use it to acquire Session Description information (including RTSP URL) via broadcast channel or interaction channel using 'SDPRef' or use inlined SDP (E4 element 'SDP'), instead of fetching Session Description information via RTSP. Further, in this case, 'AccessServerURL' E3 element MAY NOT be present. If 'type' attribute has one of the values "3", "4" or "5" either E3 element 'SessionDescription' or E3 element 'AccessServerURL' or both SHALL be instantiated. | |
| SDP | E4 | NM/TM | 0...1 | An inlined Session Description in SDP format [RFC 4566] that SHALL either be embedded in a CDATA section or base64-encoded. Contains the following attribute: encoding | string |
| encoding | A | NM/TM | 0...1 | This attribute signals the way the Session Description has been embedded: It SHALL NOT be present when the Session Description is embedded into a CDATA section. It SHALL be present and set to "base64" in case the Session Description is base64-encoded. | string |
| SDPRef | E4 | NM/TM | 0...1 | Reference to a Session Description in SDP format [RFC 4566] Contains the following attributes: uri idRef If both 'uri' and 'idRef' are present, the referenced Session Description information SHALL be identical. | |
| uri | A | NM/TM | 0...1 | The URI referencing an external resource containing SDP information. This URI is used for interactive retrieval. The terminal SHALL support HTTP URI for this purpose. | anyURI |
| idRef | A | NM/TM | 0...1 | The id of the referenced 'SessionDescription' fragment if the fragment is delivered over the broadcast channel in SGDU, globally unique | anyURI |
| USBDRef | E4 | NM/TM | 0...1 | Reference to an instance of MBMS User Service Bundle Description as specified in | |

TABLE 7-continued

| Name | Type | Category | Cardinality | Description | Data Type |
|---|---|---|---|---|---|
| | | | | [26.346] section 5.2.2, with the restrictions defined in section 5.1.2.5 of this spec. Contains the following attributes: uri idRef If both 'uri' and 'idRef' are present, the referenced Session Description information SHALL be identical. | |
| uri | A | NM/TM | 0...1 | The URI referencing an external resource containing MBMS-USBD information. This URI is used for interactive retrieval. | anyURI |
| idRef | A | NM/TM | 0...1 | The id of the referenced 'SessionDescription' fragment if the fragment is delivered over the broadcast channel in SGDU, globally unique | anyURI |
| ADPRef | E4 | NM/TM | 0...1 | Reference to an AssociatedDeliveryProcedure for File and Stream Distribution as specified in [BCAST10-Distribution] section 5.3.4. Contains the following attributes: uri idRef If both 'uri' and 'idRef' are present, the referenced Session Description information SHALL be identical. | |
| uri | A | NM/TM | 0...1 | The URI referencing an external resource containing AssociatedDeliveryProcedure for File and Stream Distribution. This URI is used for interactive retrieval. | anyURI |
| idRef | A | NM/TM | 0...1 | The id of the referenced 'SessionDescription' fragment if the fragment is delivered over the broadcast channel in SGDU, globally unique | anyURI |
| ServiceAccessNotificationURL | E3 | NM/TM | 0...N | URL that the terminal SHOULD use to notify the BSD/A when it accesses (switches to) this service over this unicast access. The 'ServiceAccessNotificationURL' MAY be used in conjunction with 'UnicastServiceDelivery' types 3, 4, 5 or 6. If used, the device SHOULD NOT use RTSP TEARDOWN and RTSP SETUP to terminate an existing RTSP stream and set up a new one. The terminal SHALL NOT use this URL for notification without user consent. Note: This URL can for example be used for initiating server-managed channel switching in unicast transmission. | anyURI |
| KeyManagementSystem | E1 | NM/TM | 0...N | Information of Key Management System(s)(KMS) that can be used to contact the BCAST Permissions Issuer and, in case of the SmartCard Profile whereby GBA is used for SMK derivation, whether | |

TABLE 7-continued

| Name | Type | Category | Cardinality | Description | Data Type |
|---|---|---|---|---|---|
| | | | | GBA_U is mandatory or whether either GBA_ME or GBA_U can be used. Note that the BCAST Permissions Issuer can support more than one KMS. If KeyManagementSystem is not specified, it means no service or content protection is applied. Multiple occurrences of 'KeyManagementSystem' elements are allowed within this fragment only if all of the 'KeyManagementSystem' elements have different 'kmsType' attribute. Contains the following elements: ProtectionKeyID PermissionsIssuerURI TerminalBindingKeyID Contains the following attributes: kmsType protectionType | |
| kmsType | A | NM/TM | 1 | Identifies the type of Key Management System(s)(KMS). Possible values: 0. oma-bcast-drm-pki Indicates OMA BCAST DRM profile (Public Key Infrastructure) 1. oma-bcast-gba_u-mbms Indicates BCAST Smartcard profile using GBA_U (Symmetric Key Infrastructure) 2. oma-bcast-gba_me-mbms Indicates BCAST Smartcard profile using GBA_ME 3. oma-bcast-prov-bcmcs Indicates provisioned 3GPP2 BCMCS SKI 4-127 Reserved for future use 128-255 Reserved for proprietary use | unsignedByte |
| protectionType | A | NM/TM | 1 | Specifies the protection type offered by the KMS. Values: 0. Content protection only, as defined by the LTKM (protection_after_reception in STKM = 0x00 or 0x01 [BCAST10-ServContProt]) 1. Service protection only (protection_after_reception in STKM = 0x03 [BCAST10-ServContProt]) 2. Content protection as defined by LTKM, plus playback of protected recording permission (protection_after_reception in STKM = 0x02 [BCAST10-ServContProt]) 3-127 Reserved for future use 128-255 Reserved for proprietary use This attribute may also be used for presentation purpose to users, to indicate whether the content item(s), associated with the referenced Schedule by this 'Access' fragment, is protected or not. | unsignedByte |

TABLE 7-continued

| Name | Type | Category | Cardinality | Description | Data Type |
|---|---|---|---|---|---|
| Permissions IssuerURI | E2 | NM/TM | 1 | The address of the BCAST Permissions Issuer to which requests for key material, tokens and/or consumption rules should be sent by the BCAST Terminal. Contains the following attribute: type | anyURI |
| type | A | NM/TM | 1 | The type of the PermissionsIssuerURI, identified by the following values: false-DRM Profile true - Smartcard Profile Note: In the case of the DRM Profile, the PermissionsIssuerURI corresponds to the RightsIssuerURL as defined by [DRMDRM-v2.0]. In the case of the Smartcard Profile, the PermissionsIssuerURI corresponds to the network entity (i.e. the BSM) to which all BCAST Service Provisioning messages are sent by the terminal. | boolean |
| ProtectionKeyID | E2 | NO/TO | 0 ... N | Key identifier needed to access protected content. This information allows the terminal to determine whether or not it has the correct key material to access services within a PurchaseItem. In a scenario where this fragment is shared among multiple service providers, different key identifiers from the different service providers to access this specific protected service/content may be mixed in this element and the terminal SHOULD be able to sort out the key identifiers associated with the terminal's affiliated service provider based on the Key Domain ID. How this is used is out of scope and is left to implementation. The network and terminal SHALL support this element in case the Smartcard Profile is supported [BCAST10-ServContProt]. The protection key identifiers to access a specific service or content item SHALL only be signalled in one of the following fragment types: 'Service', 'Content', 'PurchaseItem' or 'Access' fragments, but not mixed. Contains the following attribute: type | base64 Binary |
| type | A | NM/TM | 1 | Type of ProtectionKeyID: 0: ProtectionKeyID = Key Domain ID concatenated with SEK/PEK ID, where both values are as used in the Smartcard Profile [BCAST10-ServContProt]. 1-127 Reserved for future use 128-255 Reserved for proprietary use | unsignedByte |

TABLE 7-continued

| Name | Type | Category | Cardinality | Description | Data Type |
|---|---|---|---|---|---|
| TerminalBindingKeyID | E2 | NO/TO | 0...1 | Number identifying the Terminal Binding Key ID (TBK ID) that is needed to access the service. If the element is absent, no TerminalBindingKey is used. Both the network and the terminal with the Smartcard Profile SHALL support this element. It is TM for terminals with the smartcard profile. This element does not apply to the DRM profile. Contains the following attribute: tbkPermissionsIssuerURI | unsignedInt |
| tbkPermissionsIssuerURI | A | NO/TM | 0...1 | Specifies the Permissions Issuer URI for the TerminalBindingKey if it is different from the 'PermissionsIssuerURI' sub-element of the 'KeyManagementSystem' element. If the attribute is not present the same 'PermissionsIssuerURI' indicated for KeyManagementSystem is used to acquire both SEK/PEK and TerminalBindingKey. | anyURI |
| Encryption Type | E1 | NM/TM | 0...N | Specifies which encryption methods the terminal is to be able to support in order to utilize this Access. Contains the same value as traffic_protection_protocol signalled in STKM. 0 - IPsec 1 - STRP 2 - ISMACryp 3 - DCF 4-255 - Reserved for future use. If this element is not present, this Access is not encrypted. | unsignedByte |
| ServiceReference | E1 | NM/TM | 0...N | Reference to the 'Service' fragment(s) to which the 'Access' fragment belongs. Either one of 'ServiceReference' or 'ScheduleReference', or neither, but not both SHALL be instantiated. Each 'Service' fragment SHALL be associated to at least one 'Access' fragment to enable the terminal to access the Service. A single 'Access' fragment MAY reference to multiple 'Service' fragments. This is used when there are several independent descriptions of a single Service. | |
| idRef | A | NM/TM | 1 | Identification of the 'Service' fragment which this 'Access' fragment is associated with. | anyURI |
| ScheduleReference | E1 | NM/TM | 0...N | Reference to the 'Schedule' fragment(s) to which the 'Access' fragment belongs. This provides a reference to a 'Schedule' fragment to temporarily override the default 'Access' fragment of the Service addressed by the Schedule. | |

TABLE 7-continued

| Name | Type | Category | Cardinality | Description | Data Type |
|---|---|---|---|---|---|
| | | | | Either one of 'ServiceReference' or 'ScheduleReference', or neither, but not both SHALL be instantiated. Note: Implementation in XML Schema using <choice>. Contains the following attribute: idRef Contains the following element: DistributionWindowID | |
| idRef | A | NM/TM | 1 | Identification of the 'Schedule' fragment which the 'Access' fragment relates to. | anyURI |
| DistributionWindowID | E2 | NO/TM | 0...N | Relation reference to the DistributionWindowID to which the 'Access' fragment belongs. The 'DistributionWindowID' element declared in this element SHALL be the complete collection or a subset of the DistributionWindow ids declared in the 'Schedule' fragment, to which 'idRef' reference belongs. | unsignedInt |
| TerminalCapabilityRequirement | E1 | NO/TM | 0...1 | Terminal capabilities needed to consume the service or content. This element provides a hint to the terminal of what is needed to apply to consumption method represented by this 'Access' fragment. It is out of scope of this specification how the terminal applies this information. For video and audio, the media type and the related 'type' attribute in the SDP (see section 5.1.2.5) signal the audio/video decoder. This way, these parameters complement the TerminalCapabilityRequirement. Additionally, the complexities of the audio/video streams are described here if they differ from the complexities which can be derived from the media type attributes in the SDP (e.g. level). In this case, the parameters defined in the 'Access' fragment take priority. Contains the following elements: Video Audio DownloadFile | |
| Video | E2 | NO/TM | 0...1 | Video codec capability related requirements Contains the following elements: Complexity | |
| Complexity | E3 | NO/TM | 1 | The complexity the video decoder has to deal with. It is RECOMMENDED that this element is included if the complexity indicated by the MIME type parameters in the SDP differs from the actual complexity. Contains the following elements: | |

TABLE 7-continued

| Name | Type | Category | Cardinality | Description | Data Type |
|---|---|---|---|---|---|
| | | | | Bitrate<br>Resolution<br>MinimumBufferSize | |
| Bitrate | E4 | NO/TM | 0...1 | The total bit-rate of the video stream.<br>Contains the following attributes:<br>average<br>maximum | |
| average | A | NO/TM | 0...1 | The average bit-rate in kbit/s | unsignedShort |
| maximum | A | NO/TM | 0...1 | The maximum bit-rate in kbit/s | unsignedShort |
| Resolution | E4 | NO/TM | 0...1 | The resolution of the video.<br>Contains the following attributes:<br>horizontal<br>vertical<br>temporal | |
| horizontal | A | NO/TM | 1 | The horizontal resolution of the video in pixels. | unsignedShort |
| vertical | A | NO/TM | 1 | The vertical resolution of the video in pixels. | unsignedShort |
| temporal | A | NO/TM | 1 | The maximum temporal resolution in frames per second. | decimal |
| MinimumBufferSize | E4 | NO/TM | 0...1 | The minimum decoder buffer size needed to process the video content in kbytes. | unsignedInt |
| Audio | E2 | NO/TM | 0...1 | The audio codec capability.<br>Contains the following element:<br>Complexity | |
| Complexity | E3 | NO/TM | 1 | The complexity the audio decoder has to deal with. It is RECOMMENDED that this element is included if the complexity indicated by the MIME type parameters in the SDP differs from the actual complexity.<br>Contains the following elements:<br>Bitrate<br>MinimumBufferSize | |
| Bitrate | E4 | NO/TM | 0...1 | The total bit-rate of the audio stream.<br>Contains the following attributes:<br>average<br>maximum | |
| average | A | NO/TM | 0...1 | The average bit-rate in kbit/s | unsignedShort |
| maximum | A | NO/TM | 0...1 | The maximum bit-rate in kbit/s | unsignedShort |
| MinimumBufferSize | E4 | NO/TM | 0...1 | The minimum decoder buffer size needed to process the audio content in kbytes. | unsignedInt |
| DownloadFile | E2 | NO/TM | 0...1 | The required capability for the download files.<br>Contains the following elements:<br>MIMEType | |
| MIMEType | E3 | NO/TM | 1...N | Assuming a download service consists of a set of files with different MIME types which together make up the service, the terminal must support all of these MIME types in order to be able to present the service to the user.<br>The format of this string SHALL follow the 'Content-Type' syntax defined in [RFC 2045].<br>Additionally the 'Content-Type' MAY be | string |

TABLE 7-continued

| Name | Type | Category | Cardinality | Description | Data Type |
|---|---|---|---|---|---|
| | | | | augmented as defined in [RFC 4281]. In the latter case the 'Content-Type' SHALL begin by "audio/3gpp", "audio/3gpp2", "video/3gpp", "video/3gpp2" Contains the following attribute: codec | |
| codec | A | NO/ TM | 0 . . . 1 | The codec parameters for the associated MIME Media type. If the file's MIME type definition specifies mandatory parameters, these MUST be included in this string. Optional parameters containing information that can be used to determine as to whether the terminal can make use of the file SHOULD be included in the string. One example of the parameters defined for audio/3GPP, audio/3GPP2, video/3GPP, video/3GPP2 is specified in [RFC4281]. | string |
| BandwidthRequirement | E1 | NO/ TM | 0 . . . 1 | Specification of needed network bandwidth in kbit/s to the access channel described in this fragment. A broadcast service can include multiple accessible streams (same content) with different bandwidth, so that the terminal can make a choice depending on its current reception condition. | unsignedInt |
| ServiceClass | E1 | NM/ TM | 1 | The ServiceClass identifies the class of service. This identification is more detailed than the 'ServiceType' element in the 'Service' fragment and allows the association of service/access combination to specific applications. Contains the following attributes: urn Contains the following elements: ReferredSGInfo | |
| urn | A | NM/TM | 1 | Specifies the ServiceClass as defined in OMNA registry (see Appendix E). The Terminal SHALL be able to interpret the information. | string |
| ReferredSG Info | E2 | NM/ TM | 0 . . . 1 | Specifies the additional information for referred Service Guide. This element SHALL be present only when 'ServiceClass' is "urn:oma:bcast:oma_bsc:csg:1.0" or "urn:oma:bcasst:oma_bsc:sg:1.0". Contains the following elements: BSMSelector ServiceIDRef ServiceGuideDeliveryUnit | |
| BSMSelector | E3 | NM/ TM | 0 . . . N | Specifies the BSM associated with the referred Service Guide. Contains the following attribute: idRef | |

TABLE 7-continued

| Name | Type | Category | Cardinality | Description | Data Type |
|---|---|---|---|---|---|
| idRef | A | NM/TM | 1 | Reference to the identifier of the BSMSelector declared within the 'BSMList' in the ServiceGuideDeliverDescriptor which is used for receiving this fragment. | anyURI |
| SPName | E4 | NO/TM | 0...1 | Provides a user readable name for the BSMSelector, possibly multiple language. Values should be the same as provided in ServiceGuideDeliveryDescriptor referenced by idRef above. This element can be used to provide information to the user for selecting relevant referred Service Guide. | string |
| ServiceIDRef | E3 | NM/TM | 0...1 | The value of this field is the fragment ID of the 'Service' fragment related to the referred Service Guide. | anyURI |
| ServiceGuideDeliveryUnit | E3 | NM/TM | 1...N | A group of fragments. Contains the following attributes: transportObjectID, versionIDLength, contentLocation, validFrom, validTo Contains the following element: Fragment | |
| transportObjectID | A | NM/TM | 0...1 | The transport object ID of the Service Guide Delivery Unit carrying the declared fragments within this group. If 'FileDescription' is present in this fragment, then the value of 'transportObjectID' SHALL match the value of the TOI paired in the FDT instance with the 'Content-Location' having as its value the value of the 'contentLocation' attribute below. If and only if element E2 'Transport' is instantiated, SHALL this attribute be instantiated. | positiveInteger |
| versionIDLength | A | NO/TO | 0...1 | Indicates the number of least significant bits representing the version ID in the transportObjectID, when Split TOI is used. If this element is omitted, the terminal assumes Split-TOI is not used. | unsignedLong |
| contentLocation | A | NM/TM | 1 | This is the location of the Service Guide Delivery Unit. It corresponds to the 'Content-Location' attribute in the FDT. If and only if element E2 'Transport' is instantiated, SHALL this attribute be instantiated. | anyURI |
| validFrom | A | NM/TM | 0...1 | The first moment of time this group of Service Guide fragments is valid. This field contains the 32bits integer part of an NTP time stamp. Note: If this attribute is not present, 'validFrom' attribute MUST be present in the 'Fragment' sub-element. | unsignedInt |
| validTo | A | NM/TM | 0...1 | The last moment of time this group of Service Guide fragments is valid. This field contains the 32bits integer part | unsignedInt |

TABLE 7-continued

| Name | Type | Category | Cardinality | Description | Data Type |
|---|---|---|---|---|---|
| | | | | of an NTP time stamp. Note: If this attribute is not present, 'validTo' attribute MUST be present in the 'Fragment' sub-element. | |
| Fragment | E4 | NM/TM | 1 . . . N | Declaration of Service Guide fragment. If the fragment is available over the broadcast channel it MUST be present here. If the fragment is available over the interaction channel it MAY be present here. Contains the following attributes: transportID, id version validFrom validTo fragmentEncoding fragmentType Contains the following element: GroupingCriteria | |
| transportID | A | NM/TM | 0 . . . 1 | The identifier of the announced Service Guide fragment to be used in the Service Guide Delivery Unit header. Note: if the SG is delivered over the broadcast channel only, this element MUST be present | unsignedInt |
| id | A | NM/TM | 1 | The identifier of the announced Service Guide fragment. | anyURI |
| version | A | NM/TM | 1 | The version of the announced Service Guide fragment. Note: The scope of the version is limited to the given transport session. The value of version turn over from 2=− 1 to 0. | unsignedInt |
| validFrom | A | NM/TM | 0 . . . 1 | The first moment when this fragment is valid. If not given, the validity is assumed to have started at some time in the past. This field contains the 32bits integer part of an NTP time stamp. Note: If this attribute is present and 'validFrom' attribute of 'ServiceGuideDeliveryUnit' is also present, the value of this attribute overrides the value of 'ServiceGuideDeliveryUnit' attribute 'validFrom'. | unsignedInt |
| validTo | A | NM/TM | 0 . . . 1 | The last moment when this fragment is valid. If not given, the validity is assumed to end in undefined time in the future. This field contains the 32bits integer part of an NTP time stamp. Note: If this attribute is present and 'validTo' attribute of 'ServiceGuideDeliveryUnit' is also present, the value of this attribute overrides the value of 'ServiceGuideDeliveryUnit' attribute 'validTo'. | unsignedInt |
| fragmentEncoding | A | NM/TM | 1 | Signals the encoding of a Service Guide fragment, with the following values: 0 - XML encoded OMA BCAST Service Guide fragment 1 - SDP fragment 2 - MBMS User Service | unsignedByte |

TABLE 7-continued

| Name | Type | Category | Cardinality | Description | Data Type |
|------|------|----------|-------------|-------------|-----------|
| | | | | Description as specified in [26.346] (see 5.1.2.4, SessionDescriptionReference) 3 - XML encoded Associated Delivery Procedure as specified in [BCAST10-Distribution] section 5.3.4. 4-127 - reserved for future BCAST extensions 128-255 - available for proprietary extensions | |
| fragmentType | A | NM/TM | 0 . . . 1 | This field signals the type of an XML encoded BCAST Service Guide fragment, with the following values: 0 - unspecified 1 - 'Service' Fragment 2 - 'Content' fragment 3 - 'Schedule' Fragment 4 - 'Access' Fragment 5 - 'PurchaseItem' Fragment 6 - 'PurchaseData' Fragment 7 - 'PurchaseChannel' Fragment 8 - 'PreviewData' Fragment 9 - 'InteractivityData' Fragment 10-127 - reserved for BCAST extensions 128-255 - available for proprietary extensions This attribute SHALL be present in case 'fragmentEncoding' = 0. Default: 0 | unsignedByte |
| PreviewDataReference | E1 | NM/TM | 0 . . . N | Reference to the 'PreviewData' fragment which specifies the preview data (e.g. picture, video clip, or low-bit rate stream) associated with this access. It is possible that there are more than one PreviewDataReference instances associated with the same fragment, in which case, the values of "usage" attributes of these PreviewDataReference instances SHALL be different. Contains the following attributes: idRef usage | |
| idRef | A | NM/TM | 1 | Identification of the 'PreviewData' fragment which this fragment associated with. | anyURI |
| usage | A | NM/TM | 1 | Specifies the usage of the associated preview data. Possible values: 0. unspecified 1. Service-by-Service Switching 2. Service Guide Browsing 3. Service Preview 4. Barker 5. Alternative to blackout 6-127. reserved for future use 128-255. reserved for proprietary use The explanation and limitation on the above preview data usages is specified in section 5.7. | unsignedByte |
| Notification Reception | E1 | NM/TM | 0 . . . 1 | Reception information for service-specific Notification Messages. In case of delivery over | |

TABLE 7-continued

| Name | Type | Category | Cardinality | Description | Data Type |
|---|---|---|---|---|---|
| | | | | Broadcast channel, 'IPBroadcastDelivery' specifies the address information for receiving Notification message. In case of delivery over Interaction channel, 'RequestURL' specifies address information for subscribing notification, 'PollURL' specifies address information for polling notification. If this element is present, at least one of the elements "IPBroadcastDelivery", "RequestURL", or "PollURL" SHALL be present. Contains the following elements: IPBroadcastDelivery RequestURL PollURL | |
| IPBroadcast Delivery | E2 | NM/TM | 0 . . . 1 | Provides IP multicast address and port number for reception of Notification Messages over the broadcast channel. The 'port' is MANDATORY in both Network and Terminal because a designated UDP Port has to be used to deliver the Notification Message through an on-going session or the designated session while the 'address' is OPTIONAL to be used for the delivery of Notification Messages through the designated multicast or broadcast session. In case the 'address' attribute is not provided the destination address provided by this access fragment SHALL be assumed. Contains the following attributes: port address | |
| port | A | NM/TM | 1 | Service-specific Notification Message delivery UDP destination port number, delivery over broadcast channel. | unsignedInt |
| address | A | NM/TM | 0 . . . 1 | Service-specific Notification Message delivery IP multicast address, delivery over broadcast channel. | string |
| RequestURL | E2 | NM/TM | 0 . . . 1 | URL through which the terminal can subscribe to service-specific Notification Messages. | anyURI |
| PollURL | E2 | NM/TM | 0 . . . 1 | URL through which the terminal can poll service-specific Notification Messages. | anyURI |
| PrivateExt | E1 | NO/TO | 0 . . . 1 | An element serving as a container for proprietary or application-specific extensions. | |
| <proprietary elements> | E2 | NO/TO | 0 . . . N | Proprietary or application-specific elements that are not defined in this specification. These elements may further contain sub-elements or attributes. | |

In step 411, the terminal receives the stand-alone SG or the complementary SG, forms the SG, and displays it to the user.

In relation to the present invention, 'BSMSelector', 'ServiceIDRef', and 'ServiceGuideDeliveryUnit' are defined as sub-elements of ReferredSGInfo in Table 7. Other preliminary information about the stand-alone SG or the complementary SG can be additionally provided by use of the sub-elements of ReferredSGInfo.

The uses of the sub-elements of ReferredSGInfo will be described below.

The sub-element BSMSelector specifies the service provider that provides the stand-alone SG or the complementary SG. The service provider can be identified by an IDentifier (ID) of a BSMSelector by idREF or another name that the user can identify. In the former case, the terminal checks a BSMList defined in the SGDD used for receiving the basic SG, searches for BSMSelector information matching to the idRef in the BSMList, and acquires information such as a BSM code corresponding to the service provider or a service provider name that the user can identify. After receiving the stand-alone SG or the complementary SG, the terminal can classify and manage the SG on a code or a service provider name basis using the information. Or the basic SG may provide the information to the user so that the user can selectively receive an SG. This information can be provided in the form of a user-identifiable name directly to the user by 'SPName' as well as in the form of an ID by idRef.

The sub-element ServiceIDRef indicates a service associated with the stand-alone SG or the complementary SG within the basic SG. ServiceIDRef includes an ID identifying a Service fragment corresponding to the service. Therefore, when ServiceIDRef includes an ID, the terminal detects a Service fragment that matches the ID in the basic SG and is aware that the stand-alone SG or the complementary SG to be received is associated with the detected Service fragment.

The sub-element ServiceGuideDeliveryUnit indicates SGDUs associated with the stand-alone SG or the complementary SG in a delivery session that the Access fragment indicates. The service provider provides the basic SG and the stand-alone SG or the complementary SG in the same delivery session by providing an SGDU list, so that SGs can be received, classified and managed according to the SGDU list.

Figure 7:
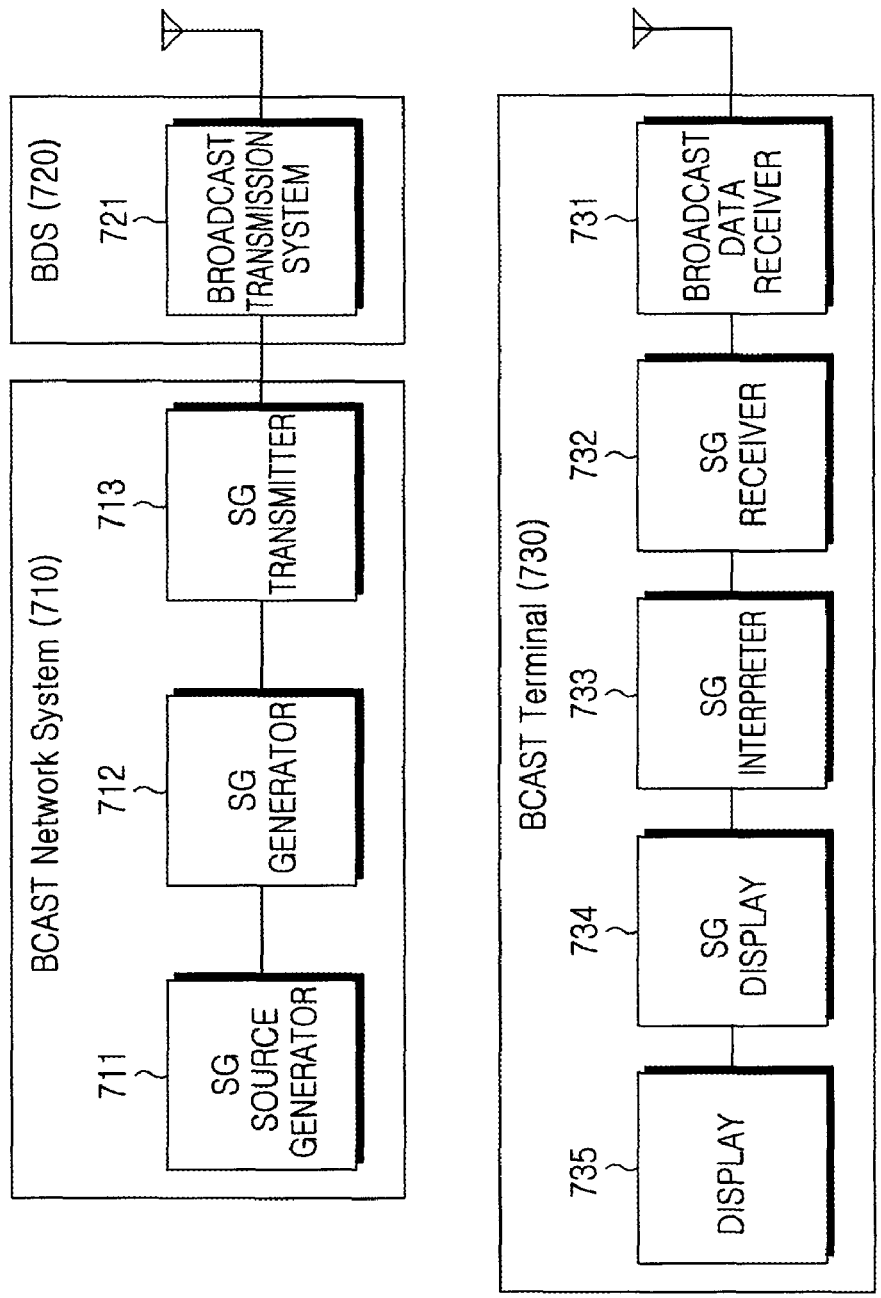
FIG. 7 is a block diagram of a system and a terminal according to an exemplary embodiment of the present invention.

FIG. 7 is a block diagram of a BCAST network system for providing a BCAST service and a BCAST terminal according to an exemplary embodiment of the present invention.

Figure 1:
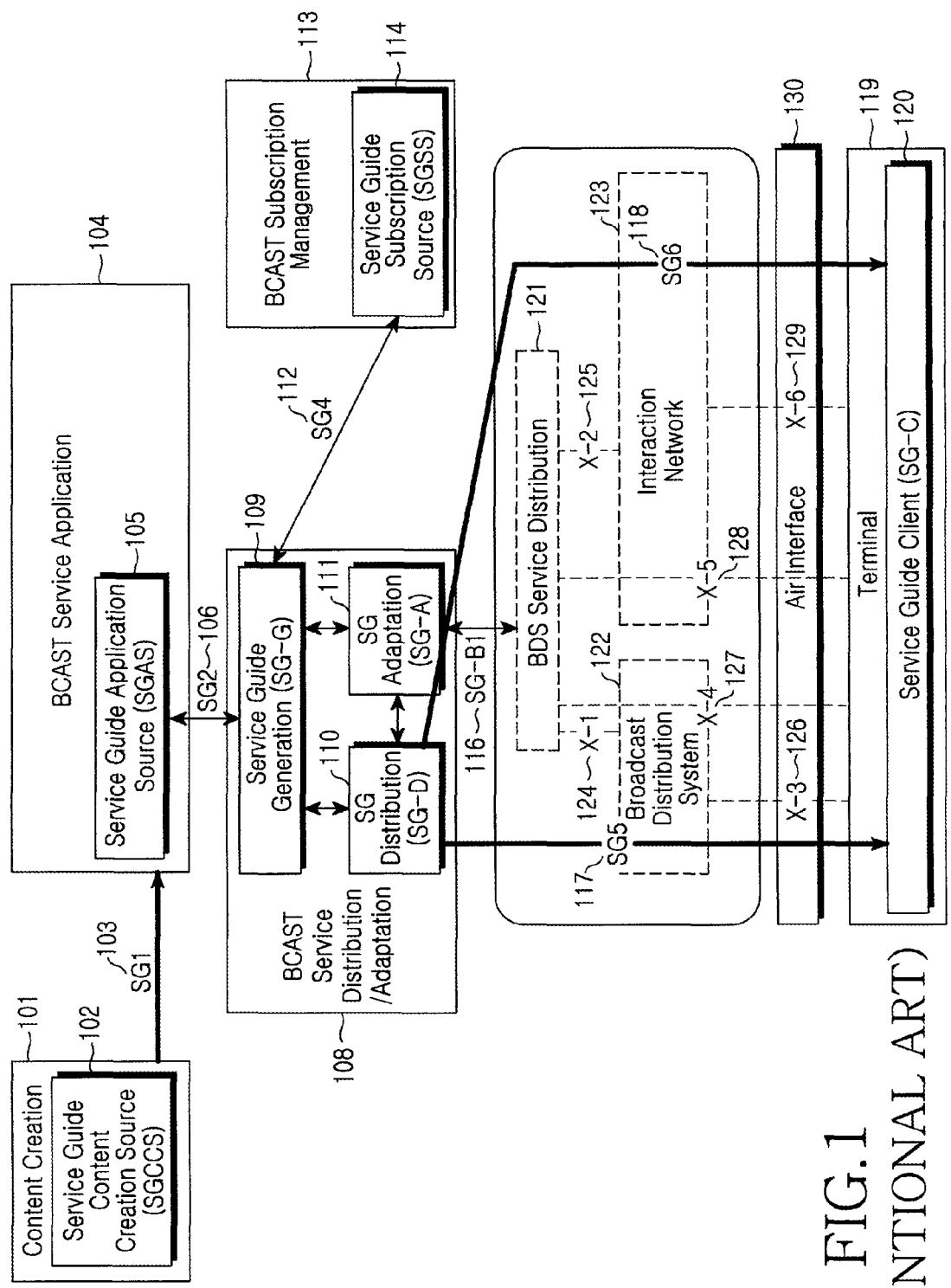
FIG. 1 is a diagram illustrating the logical structure of conventional OMA BCAST SG functions.
Figure 2:
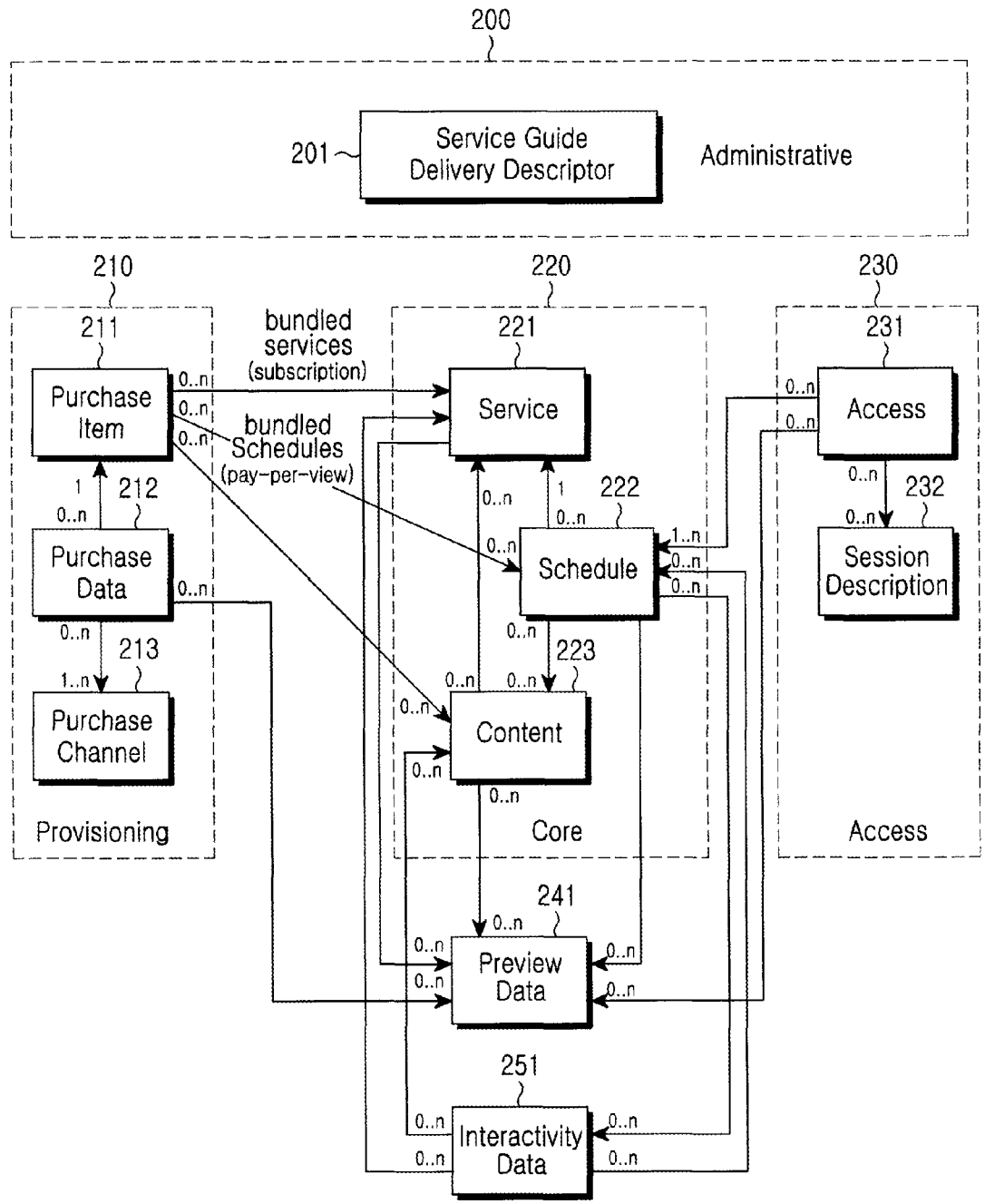
FIG. 2 is a data model of a conventional OMA BCAST SG.

Referring to FIG. 7, a BCAST network system 710 can include the entities of the content creator 101, the BCAST service application 104, the BCAST service distributor/adapter 108, and the BSCAST subscription manager 113 illustrated in FIG. 1. In relation to an SG, the BCAST network system 710 includes an SG source generator 711, an SG generator 712 and an SG transmitter 713.

The SG source generator 711 can include the entities of the SGCCS 102, the SGAS 105, and the SGSS 114 illustrated in FIG. 1 and provides basic information about services and programs with which to generate an SG.

The SG generator 712 receives the SG generation information from the SG source generator 711 and generates an SG using the SG generation information. The SG generator 712 may include the entities of the SG-G 109 and the SG-A 111 illustrated in FIG. 1. The SG generator 712 also generates SG fragments and defines cross-references between the fragments. Especially, the SG generator 712 defines cross-references between fragments for a basic SG, a stand-alone SG, and a complementary SG according to an exemplary embodiment of the present invention.

The SG transmitter 713 may include the entity of the SG-D 110. The SG transmitter 713 is responsible for transmitting the SG generated from the SG generator 712. In particular, the SG transmitter 713 forms delivery sessions to carry the basic SG and the stand-alone to complementary SG for the fragments generated by the SG generator 712 and transmits the fragments in the delivery sessions in the exemplary embodiment of the present invention.

A BDS 720 is a system that provides broadcast channels, including a broadcast transmission system 721 that can be DVB-H, 3GPP MBMS, 3GPP2 BCMCS and the like.

A BCAST terminal 730 corresponds to the terminal 119 of FIG. 1. In accordance with an exemplary embodiment of the present invention, the BCAST terminal 730 receives, interprets and displays an SG. The BCAST terminal 730 may include a broadcast data receiver 731 for receiving broadcast data, an SG receiver 732 for receiving an SG, an SG interpreter 733 for interpreting the SG, and an SG display 734 for displaying the SG on a display 735.

The SG receiver 732, the SG interpreter 733, and the SG display 734 perform the functions of the SG-C 120 illustrated in FIG. 1. More specifically, the SG receiver 732 receives the basic SG, the SG interpreter 733 interprets fragments of the basic SG and the SG display 734 displays the interpretation result on the display 735 for the user in the exemplary embodiment of the present invention. When the user selects an intended service, the BCAST terminal 730 acquires information about the selected service by checking an associated Access fragment in the basic SG, receiving the Access fragment through the broadcast data receiver 731 and the SG receiver 732, and interpreting it through the SG interpreter 733. Then the BCAST terminal 730 displays the acquired information on the display 735.

As is apparent from the above description, the present invention provides another SG through a basic SG. As a large SG can be distributed separately as a basic SG and a complementary SG to the basic SG or a stand-alone SG, SG transmission is more efficient. Earlier transmission of the basic SG than others saves SG reception time and provides information to users more rapidly.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for receiving a Service Guide (SG) in a terminal in a mobile broadcasting system, the method comprising:
   receiving, by the terminal, a first SG;
   acquiring, by the terminal, if a service type of at least one service fragment extracted from the first SG is set to an SG, reception information about a second SG from at least one access fragment of the first SG;
   receiving, by the terminal, the second SG based on the acquired reception information,
   wherein the access fragments are associated with the service fragments,
   wherein the reception information about the second SG comprises information about a delivery session carrying the second SG, and
   wherein the reception information about the second SG further comprises at least one of information about a service provider that provides the second SG.

2. The method of claim 1, wherein the receiving of the first SG comprises:
   accessing an announcement session and receiving a Service Guide Delivery Descriptor (SGDD) in the announcement session;
   acquiring information about a delivery session carrying the first SG by interpreting the SGDD;
   accessing the delivery session and receiving a Service Guide Delivery Unit (SGDU) for the first SG in the delivery session;

extracting fragments of the first SG from the received SGDU;

forming the first SG using the extracted fragments; and displaying the first SG.

3. The method of claim 1, wherein the receiving of the second SG comprises:

accessing the delivery session carrying the second SG and receiving an SGDU for the second SG in the delivery session;

extracting fragments of the second SG from the SGDU for the second SG;

forming the second SG using the extracted fragments; and displaying the second SG.

4. The method of claim 1, wherein the reception information about the second SG further comprises at least one of information about the relationship between the second SG and the first SG, and the relationship between the second SG and SGDUs for the second SG.

5. A method for providing a Service Guide (SG) in a mobile broadcasting system, the method comprising:

forming a first SG and at least one second SG;

setting a service type of at least one service fragment included in the first SG to an SG and adding reception information about the second SG to at least one access fragment of the first SG;

transmitting the first SG having the reception information about the second SG to a terminal;

providing the second SG to the terminal, when the terminal accesses the reception information about the second SG, wherein the access fragments are associated with the service fragments, wherein the reception information about the second SG comprises information about a delivery session carrying the second SG, and wherein the reception information about the second SG further comprises at least one of information about a service provider that provides the second SG.

6. The method of claim 5, wherein the transmitting of the first SG comprises:

providing a Service Guide Delivery Descriptor (SGDD) to the terminal, when the terminal accesses an announcement session; and providing a Service Guide Delivery Unit (SGDU) for the first SG to the terminal, when the terminal accesses a delivery session carrying the first SG by interpreting the SGDD.

7. The method of claim 5, wherein the reception information about the second SG further comprises at least one of information about the relationship between the second SG and the first SG, and the relationship between the second SG and SGDUs for the second SG.

8. An apparatus for receiving a Service Guide (SG) in a terminal in a mobile broadcasting system, the apparatus comprising:

a broadcast data receiver for receiving broadcasting data;

an SG receiver for acquiring a first SG and at least one second SG from the broadcast data;

an SG interpreter for interpreting the first SG and for acquiring, if a service type of at least one service fragment extracted from the first SG is set to an SG, reception information about the second SG from at least one access fragment of the first SG;

an SG display for displaying at least one of the acquired first SG and the second SG, wherein the access fragments are associated with the service fragments, wherein the SG receiver accesses the delivery session carrying the second SG, and wherein the reception information about the second SG further comprises at least one of information about a service provider that provides the second SG.

9. The apparatus of claim 8, wherein the SG receiver receives a Service Guide Delivery Descriptor (SGDD) in an announcement session, when the terminal accesses the announcement session, and the SG interpreter acquires information about a delivery session carrying the first SG by interpreting the SGDD.

10. The apparatus of claim 9, wherein the SG receiver accesses the delivery session carrying the first SG and receives a Service Guide Delivery Unit (SGDU) for the first SG in the delivery session, and the SG interpreter extracts fragments of the first SG from the received SGDU.

11. The apparatus of claim 8, wherein the reception information about the second SG comprises information about a delivery session carrying the second SG.

12. The apparatus of claim 8, wherein the SG receiver receives an SGDU for the second SG in the delivery session and the SG interpreter extracts fragments of the second SG from the SGDU for the second SG.

13. The apparatus of claim 8, wherein the reception information about the second SG further comprises at least one of information about the relationship between the second SG and the first SG, and the relationship between the second SG and SGDUs for the second SG.

14. An apparatus for providing a Service Guide (SG) in a mobile broadcasting system, the apparatus comprising:

an SG generator for forming a first SG and at least one second SG, for setting a service type of at least one service fragment included in the first SG to an SG, and for adding reception information about the second SG to at least one access fragment of the first SG;

an SG transmitter for transmitting the first SG having the reception information about the second SG to a terminal, and for providing the second SG to the terminal, when the terminal accesses the reception information about the second SG, wherein the access fragments are associated with the service fragments, wherein the reception information about the second SG comprises information about a delivery session carrying the second SG, and wherein the reception information about the second SG further comprises at least one of information about a service provider that provides the second SG.

15. The apparatus of claim 14, wherein the SG transmitter provides a Service Guide Delivery Descriptor (SGDD) to the terminal, when the terminal accesses an announcement session, and provides a Service Guide Delivery Unit (SGDU) for the first SG to the terminal, when the terminal accesses a delivery session carrying the first SG by interpreting the SGDD.

16. The apparatus of claim 14, wherein the reception information about the second SG further comprises at least one of information about the relationship between the second SG and the first SG, and the relationship between the second SG and SGDUs for the second SG.

* * * * *